United States Patent
Foster

(10) Patent No.: US 9,413,883 B2
(45) Date of Patent: *Aug. 9, 2016

(54) CALL STATUS SHARING

(71) Applicant: Google Inc., Mountain View, CA (US)

(72) Inventor: Marcus Foster, London (GB)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/735,593

(22) Filed: Jun. 10, 2015

(65) Prior Publication Data
US 2015/0281437 A1 Oct. 1, 2015

Related U.S. Application Data

(62) Division of application No. 12/963,408, filed on Dec. 8, 2010, now Pat. No. 9,060,059.

(60) Provisional application No. 61/381,822, filed on Sep. 10, 2010.

(51) Int. Cl.
*H04M 11/00* (2006.01)
*H04M 3/42* (2006.01)
*H04W 8/18* (2009.01)

(52) U.S. Cl.
CPC ............ *H04M 3/42374* (2013.01); *H04W 8/18* (2013.01); *H04M 2203/65* (2013.01)

(58) Field of Classification Search
CPC .............. H04M 3/00; H04M 3/42374; H04M 2203/65; H04M 1/663; H04M 11/00; H04M 3/42
USPC ...................... 379/93.01, 93.17, 90.01, 93.05; 455/414.1, 414.2, 466; 715/753
See application file for complete search history.

(56) References Cited

U.S. PATENT DOCUMENTS 5,424,908 A 6/1995 Kanetake
5,764,730 A 6/1998 Rabe et al.
(Continued)

FOREIGN PATENT DOCUMENTS

JP 2005520404 A 7/2005
KR 20020011668 A 2/2002
(Continued)

OTHER PUBLICATIONS

Office Action, and translation thereof, from counterpart Korean Patent Application No. 1020137009087, dated Nov. 24, 2015, 2015, 6 pp.

(Continued)

*Primary Examiner* — Melur Ramakrishnaiah
(74) *Attorney, Agent, or Firm* — Shumaker & Sieffert, P.A.

(57) ABSTRACT

In general, techniques are described for sharing information about a client device phone call to enhance other services. In one example, a method includes receiving, at a server device, voice call parameters that describe at least one characteristic of a voice call in which a user of a first device is participating wherein the first device is physically separate from the server device, and responsive to receiving the voice call parameters, determining, by the server device, a status of the user based on the received voice call parameters. The method further includes storing an account for the user on the server device, wherein the account includes a user profile for the user and identifies contacts of the user, and modifying, by the server device, the user profile to reflect the status of the user, and sending the modified user profile to a device associated with a contact of the user.

13 Claims, 11 Drawing Sheets

(56) References Cited

U.S. PATENT DOCUMENTS

| | | | |
|---|---|---|---|
| 5,832,062 A | 11/1998 | Drake | |
| 6,266,399 B1 | 7/2001 | Weller et al. | |
| 6,580,787 B1 | 6/2003 | Akhteruzzaman et al. | |
| 6,622,021 B1 | 9/2003 | Takala | |
| 6,631,183 B1 | 10/2003 | Rautila et al. | |
| 6,658,095 B1 | 12/2003 | Yoakum et al. | |
| 6,731,323 B2 | 5/2004 | Doss et al. | |
| 6,789,064 B2 | 9/2004 | Koh | |
| 6,842,512 B2 | 1/2005 | Pedersen | |
| 7,142,656 B2 | 11/2006 | Moody et al. | |
| 7,224,966 B2 | 5/2007 | Caspi et al. | |
| 7,295,662 B2 | 11/2007 | Vitikainen et al. | |
| 7,382,868 B2 | 6/2008 | Moore et al. | |
| 7,640,300 B2 | 12/2009 | Wohlgemuth et al. | |
| 7,742,421 B2 | 6/2010 | Bantukul et al. | |
| 7,769,154 B1 | 8/2010 | Craft et al. | |
| 7,908,647 B1 | 3/2011 | Polis et al. | |
| 8,229,079 B2 | 7/2012 | Tibbits | |
| 2002/0186257 A1 | 12/2002 | Cadiz et al. | |
| 2003/0002642 A1 | 1/2003 | Jorasch et al. | |
| 2003/0073430 A1 | 4/2003 | Robertson et al. | |
| 2003/0123620 A1 | 7/2003 | Matsuyama | |
| 2004/0143841 A1 | 7/2004 | Wang et al. | |
| 2004/0156484 A1 | 8/2004 | Amin | |
| 2005/0037741 A1 | 2/2005 | Gilbert | |
| 2006/0025118 A1 | 2/2006 | Chitrapu et al. | |
| 2006/0031326 A1 | 2/2006 | Ovenden | |
| 2006/0117087 A1 | 6/2006 | Demsky et al. | |
| 2006/0140361 A1 | 6/2006 | Heikes et al. | |
| 2006/0148499 A1* | 7/2006 | Chie | H04L 12/581 455/515 |
| 2006/0210033 A1 | 9/2006 | Grech et al. | |
| 2006/0234735 A1 | 10/2006 | Digate et al. | |
| 2006/0277256 A1 | 12/2006 | Tiruthani et al. | |
| 2007/0003028 A1 | 1/2007 | Korah et al. | |
| 2007/0130260 A1 | 6/2007 | Weintraub et al. | |
| 2007/0153768 A1* | 7/2007 | Jagadesan | H04M 1/2535 370/352 |
| 2008/0155080 A1 | 6/2008 | Marlow et al. | |
| 2008/0285588 A1 | 11/2008 | Balk et al. | |
| 2009/0063676 A1 | 3/2009 | Oh et al. | |
| 2009/0067593 A1 | 3/2009 | Ahlin | |
| 2009/0107265 A1 | 4/2009 | Parker, II et al. | |
| 2009/0300525 A1 | 12/2009 | Jolliff et al. | |
| 2010/0064014 A1 | 3/2010 | McLaughlin | |
| 2010/0100952 A1 | 4/2010 | Sample et al. | |
| 2010/0144377 A1 | 6/2010 | Alakontiola | |
| 2010/0159890 A1 | 6/2010 | Sigmund et al. | |
| 2010/0208879 A1* | 8/2010 | Meriaz | H04M 3/42 379/201.02 |
| 2010/0215157 A1 | 8/2010 | Narayan et al. | |
| 2010/0273443 A1 | 10/2010 | Forutanpour et al. | |
| 2011/0053578 A1 | 3/2011 | Rochford | |
| 2012/0063577 A1 | 3/2012 | Foster | |
| 2012/0064862 A1 | 3/2012 | Foster | |
| 2012/0148033 A1 | 6/2012 | Tibbits | |

FOREIGN PATENT DOCUMENTS

| | | |
|---|---|---|
| KR | 20060080373 A | 7/2006 |
| KR | 20060130799 A | 12/2006 |
| WO | 00/59191 A1 | 10/2000 |
| WO | 2006036356 A1 | 4/2006 |

OTHER PUBLICATIONS

Office Action, and translation thereof, from counterpart Korean Application No. 10-2013-7009087, dated May 27, 2015, 9 pp.

0002360: [patch] Add temporary greetings to voicemail—Asterisk.org Issue Tracker [online]. Last updated: Jan. 15, 2008. Retrieved from the Internet: https://issues.asterisk.org/view.php?id=2360, 6 pp.

Assigning a Temporary Greeting [online]. IPOffice Phone Manager: Voicemail >Using Personal Greetings. Last modified Jan. 24, 2008. Retrieved from the Internet: <—http://marketingtools.avaya.com/knowledgebase/user/ipoffice/ mergedProjects/phonemanager/index.htm?temporarygreetings.htm> (2 pgs.).

Extended European Search Report of Application No. 11824067.0, dated Apr. 7, 2014, 9 pages.

FAQ—Setup Voice Mail for Vacation [online]. "How Do I Setup Voice Mail for Vacation?" UNI User Services. Last reviewed: Jul. 30, 2003. Retrieved from the Internet: http://www.uni.edu.its/us/faqs/vacavoice.htm, 2 pp.

International Preliminary Report on Patentability and Written Opinion of international application No. PCT/US2011/050692. dated Mar. 21, 2013, 6 pp.

International Search Report and Written Opinion of international application No. PCT/US2011/050692, dated Apr. 16, 2012, 9 pp.

Office Action from Korean Application No. 10-2013-7009087, dated Oct. 14, 2014, 13 pages.

Responsive amendment from European Patent Application No. 11824067.0, dated Nov. 6, 2014, 13 pages.

Prosecution History from U.S. Appl. No. 12/963,408 from Jun. 5, 2014 through Feb. 20, 2015 34 pp.

Prosecution History from U.S. Appl. No. 13/250,657 from Dec. 13, 2011 through Jul. 23, 2012 31 pp.

Prosecution History from U.S. Appl. No. 11/173,670 from Jun. 20, 2008 through Feb. 23, 2010 164 pp.

* cited by examiner

CALL STATUS SHARING

This application is a divisional application of U.S. patent application Ser. No. 12/963,408, filed Dec. 8, 2010, which claims the benefit of U.S. Provisional Application No. 61/381,822, filed Sep. 10, 2010, the entire content of each of which is incorporated by reference herein.

TECHNICAL FIELD

The disclosure relates to communication systems, and, more particularly, to sharing call status information across communication systems.

BACKGROUND

Various online services such as instant messaging or chat clients provide a free/busy presence status indicator that indicates a status of a user associated with an account. The user may have accounts with multiple online services. The user typically manually updates his status indicator as needed, such as by changing the status to "busy" when the user will be unavailable.

SUMMARY

In general, this disclosure is directed to techniques for sharing information about a mobile phone call to enhance other services. The techniques involve a central server being made aware of call information when a voice call is initiated or received, such as by a mobile phone notifying the server and providing some information about the call to the central server. The server can use the call information to enhance other services for the user of the mobile phone or for other users. For example, the server may use the call information to automatically update a user's real-time status, such as a Google Buzz message, a Facebook status message, an instant messaging status, or similar.

In one example, a method includes receiving, at a server device, voice call parameters that describe at least one characteristic of a voice call in which a user of a first device is participating, wherein the first device is physically separate from the server device, and responsive to receiving the voice call parameters, determining, by the server device, a status of the user based on the received voice call parameters. The method further includes storing an account for the user on the server device, wherein the account includes a user profile for the user and identifies one or more contacts of the user, and modifying, by the server device, the user profile to reflect the status of the user. The method also includes sending the modified user profile from the server device to at least one device associated with at least one of the one or more contacts of the user, such that the modified user profile is displayable by the at least one device.

In another example, a computer-readable storage medium comprises instructions that cause one or more processors of a server device to receive voice call parameters that describe at least one characteristic of a voice call in which a user of a first device is participating, wherein the first device is physically separate from the server device, and, responsive to receiving the voice call parameters, determine a status of the user based on the received voice call parameters. The instructions further cause the processors to store an account for the user on the server device, wherein the account includes a user profile for the user and identifies one or more contacts of the user, and modify the user profile to reflect the status of the user. The instructions further cause the processors to send the modified user profile from the server device to at least one device associated with at least one of the one or more contacts of the user, such that the modified user profile is displayable by the at least one device.

In a further example, a system comprises an interface of a first server device that receives voice call parameters that describe at least one characteristic of a voice call in which a user of a first device is participating, wherein the first device is physically separate from the server device, and a means for determining a status of the user based on the received voice call parameters responsive to receiving the voice call parameters. The system further comprises a database that an account for the user on the server device, wherein the account includes a user profile for the user and identifies one or more contacts of the user, and a display control module that modifies the user profile to reflect the status of the user, and sends the modified user profile from the server device to at least one device associated with at least one of the one or more contacts of the user, such that the modified user profile is displayable by the at least one device.

In yet a further example, a method includes receiving user input authorizing the client device to send voice call parameters to a server device, wherein the client device is physically separate from the server device, and, when the client device engages in a voice call and has received the user input, send a message to the server device indicating a group of voice call parameters associated with the voice call, wherein the group of voice call parameters describe at least one characteristic of the voice call in which the client device is engaged.

In another example, a method includes receiving, at a server device, voice call parameters that describe at least one characteristic of a voice call in which a user of a first device is participating, wherein the first device is physically separate from the server device, and identifying, by the server device, a second device that is associated with the user, wherein the second device is physically separate from the first device and the server device. The method further includes, responsive to receiving the voice call parameters, blocking incoming voice calls to the second device associated with the user when the voice call parameters indicate the user is participating in the voice call using the first device.

In a further example, a computer-readable storage medium includes instructions that cause one or more processors of a server device to receive voice call parameters that describe at least one characteristic of a voice call in which a user of a first device is participating, wherein the first device is physically separate from the server device, identify a second device that is associated with the user, wherein the second device is physically separate from the first device and the server device, and, responsive to receiving the voice call parameters, block incoming voice calls to the second device associated with the user when the voice call parameters indicate the user is participating in the voice call using the first device.

In yet another example, a system includes an interface of a server device that receives voice call parameters that describe at least one characteristic of a voice call in which a user of a first device is participating, wherein the first device is physically separate from the server device, and a call status module that identifies a second device that is associated with the user, wherein the second device is physically separate from the first device and the server device. The system also includes means for blocking incoming voice calls to the second device associated with the user, responsive to receiving the voice call parameters, when the voice call parameters indicate the user is participating in the voice call using the first device.

The techniques of this disclosure may provide one or more advantages. For example, the techniques of this disclosure may provide a simplified mechanism for updating various status update services. The techniques may address the issue of a mobile phone user engaged in a call, during which the user may be unable to provide full attention to other things such as receiving additional calls on other devices or responding to chat messages. The techniques of this disclosure provide for automatically updating the user's status to reflect that the user is busy on a voice call without requiring the user to manually update his status message each time the user engages in a call. The techniques provide a mechanism for automatically updating the user's profile on multiple different online applications that indicate user status, without requiring user intervention to update each of the different applications. In addition, the techniques may provide assistance to the user in automatically managing calls received on a second phone while engaged in a call on the first phone.

The details of one or more examples are set forth in the accompanying drawings and the description below. Other features, objects, and advantages will be apparent from the description and drawings, and from the claims.

DETAILED DESCRIPTION

Figure 1A:
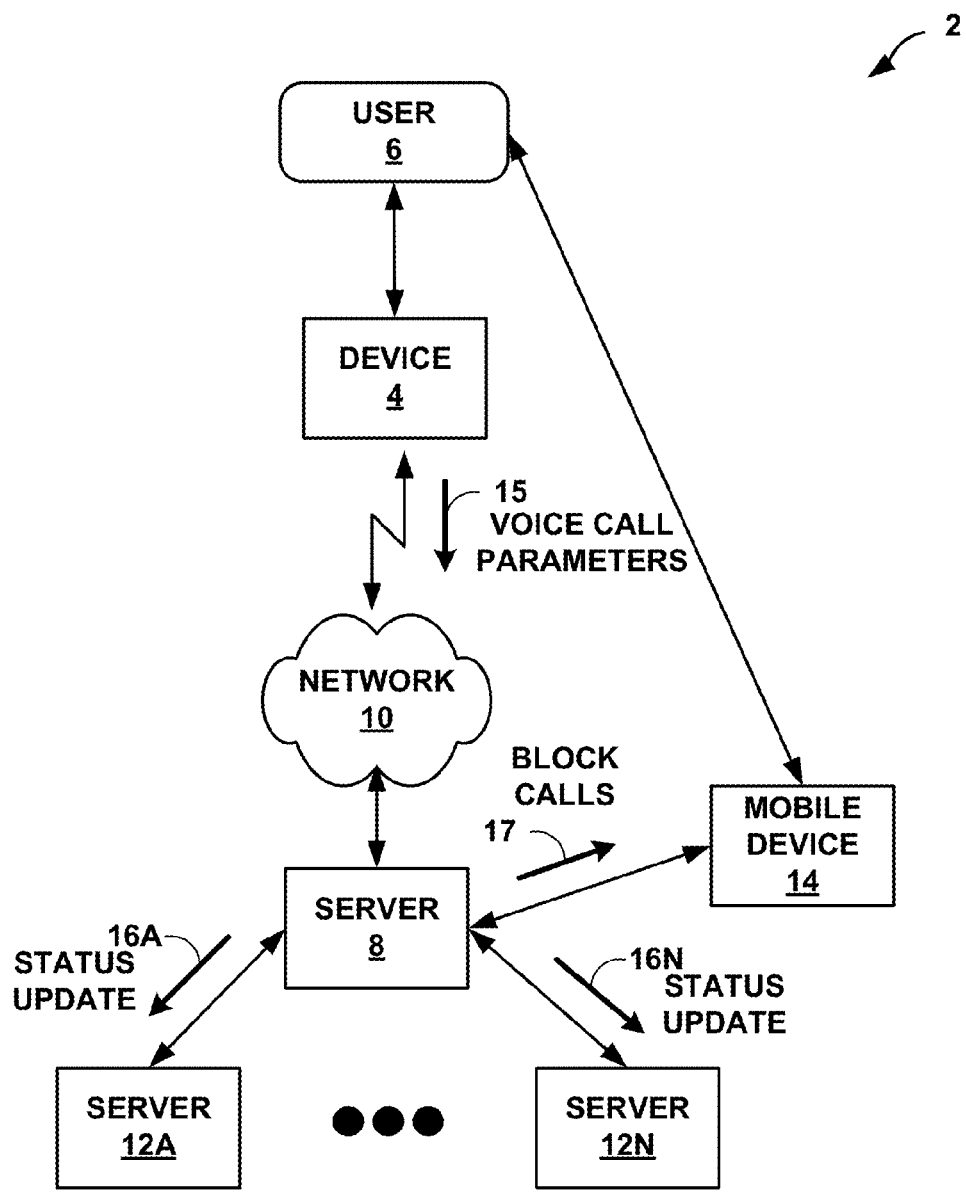
FIGS. 1A-1B are block diagrams illustrating example networked computing environments, in accordance with aspects of this disclosure.

In general, the disclosure is directed to techniques for sharing information about a client device phone call to enhance other services. The techniques may involve a central server being made aware of call information when a voice call is initiated or received, such as by a mobile phone notifying the server and providing some information about the call to the central server. The server can use the information to enhance other services for the user of the mobile phone or for other users. The techniques may address the issue of a mobile phone user engaged in a call, during which the user may be unable to provide full attention to other things such as receiving additional calls on other devices or responding to chat messages.

Various online services provide a free/busy status indicator (e.g., instant message/chat clients), but conventionally the status is typically tied only to the particular service. When engaging in a mobile phone call, a user often cannot take other incoming calls or respond to chat messages, but has no easy way of letting contacts know why he did not answer when they called or sent a message. The user could manually change his status message, but this may be cumbersome to do each time the user engages in a phone call. Furthermore, if the user needs to change his status in multiple different locations, e.g., on multiple different status information providers, the user typically needs to interact with each status information provider's user interface and set his status for each status information provider individually. Additionally, if the user has more than one phone, the user may not be able to conveniently manage calls received on a second phone while engaged in a call on the first phone. In one aspect of the techniques of this disclosure, a mobile phone may automatically provide information about a mobile phone call that a user is engaged in, to servers associated with other services so that the servers can update a free/busy status indicator for the user to show that the user is engaged in a call. In another aspect, a server receiving the mobile phone call information may automatically block an incoming call to another phone owned by the user when the user is engaged in a call on the mobile phone. Other functions may be provided based on the call information.

In one example, a mobile phone may automatically send a message to the central server upon initiating or receiving a call. For example, the message may be a HyperText Transfer Protocol (HTTP) message or a Short Message Service (SMS) message, automatically issued by the mobile phone without user intervention. The message may include a telephone number associated with a device that initiated the telephone call, a telephone number associated with a device to which the telephone was directed, a timestamp indicating a start time of the call, and an authentication token that allows the server to recognize the user associated with the device. In another example, the user may be using a Google Voice application to make the phone call, in which case a Google server associated with the Google Voice application may already have access to the call information without a mobile device having to send the information in a dedicated communication. The central server may use this information to update a status indicator of the user in a variety of ways, such as to simply show the user is busy, to show that the user is engaged in a call, to identify the other party/parties to the call, to indicate the duration of the call, or to provide other information.

Any type of mobile phone could employ these techniques with an Application Programming Interface (API) installed to send the information to the central server. In one aspect, the mobile phone may present configuration options to the user, allowing the user to choose whether to even share call information with other online services, and may allow the user to select which online services the information will be shared with (e.g., Facebook, Google, Twitter). In one aspect, the mobile device may send the message to a central server, which then distributes the information to the various interested online services. In another aspect, the mobile device itself may distribute the information directly to the various service subscribers by sending multiple messages in a one-to-many fashion.

FIG. 1A is a block diagram illustrating an example networked computing environment 2, in accordance with one aspect of the present disclosure. As shown in FIG. 1, computing system 2 includes device 4 used by user 6, server 8 accessible to device 4 via a network 10, and one or more servers 12A-12N ("servers 12") and mobile device 14. Examples of device 4 include, but are not limited to, portable or mobile devices such as cellular phones, personal digital assistants (PDAs), laptop computers, portable gaming devices, portable media players, as well as non-portable devices such as desktop computers. Device 4 may also be referred to as a client device. For purposes of illustration only in this disclosure, device 4 is described as a mobile phone device, but aspects of this disclosure should not be considered limited to mobile phone devices. Network 10 may be, for example, a telephone network, by which voice calls may be made using mobile phones.

User 6 may use device 4 to receive or initiate a voice call. For example, user 6 may use device 4, e.g., a mobile phone, to make a voice call. In one example, when device 4 begins the call, device 4 automatically sends a message 15 containing voice call parameters to server 8 via network 10. Message 15 may be, for example, a HyperText Transfer Protocol (HTTP) message or a Short Message Service (SMS) message, automatically issued by device 4 without any intervention by user 6. Message 15 may include voice call parameters such as a telephone number associated with a device that initiated the telephone call (e.g., device 4), a telephone number associated with a device to which the telephone was directed, a timestamp indicating a start time of the call, and an authentication token that allows server 8 to recognize the user 6 associated with device 4. Other voice call parameters may be used in addition or instead of these parameters. In a similar manner, device 4 may send a message 15 when device 4 receives a voice call from another caller. Device 4 may also send a message 15 with new voice call parameters when device 4 concludes a voice call. For example, upon concluding the voice call device 4 may send a message 15 that includes a timestamp indicating an end time of the call. Message 15 may also include a voice call parameter that indicates whether the call is starting or has ended.

Upon receiving message 15 with the voice call parameters, server 8 determines a status of user 6 based on the received voice call parameters. For example, server 8 may determine based on the received voice call parameters that user 6 is engaged in a phone call and thus has a "busy" status. As another example, server 8 may determine based on the received voice call parameters that user 6 has concluded a phone call and thus has a "free" status.

In the example of FIG. 1A, server 8 acts as a central server for transmitting messages to other servers and/or devices to enhance user services based on the voice call parameters received from device 4 and the determine status. For example, upon determining the status of the user, server 8 may then send status update messages 16A-16N ("status update messages 16") to other servers 12A-12N associated with various online services. Server 8 may determine which of servers 12 to send status update messages 16, if any, based on configuration settings maintained by server 8 for user 6. Server 8 may be configured with APIs to automatically provide servers 12 with status update messages 16 in required formats for updating the free/busy status of a profile associated user 6.

In one example scenario, mobile device 14 may be a mobile device belonging to user 6. When user 6 is engaged in a phone call using device 4, user 6 may be unavailable to take calls on mobile device 14, e.g., a mobile phone. In one aspect, server 8 is configured to, upon determining that user 6 is engaged in a phone call, send a command 17 to mobile device 14 to cause mobile device 14 to block incoming calls from ringing on mobile device 14 and instead to send the calls directly to voice mail. When server 8 subsequently receives another message 15 with voice call parameters indicating that device 4 has ended a call, server 8 may send another command 17 to cause mobile device 14 to remove the block on incoming calls from mobile device 14. In this manner, server 8 may provide functionality based on the voice call parameters received from device 4 to enhance user service.

User 6 may configure settings on device 4 to enable device 4 to send message 15, or user 6 may choose to disable this functionality. User 6 may also set configuration settings on one or more of servers 12. For example, a user may configure settings for their user profile on an online application service (e.g., an online social networking service), provided by server 12A, to show the user's free/busy status on their profile. Specifically, the user may configure settings to allow their profile displays a busy sign when they are on a voice call, and to allow their profile to display to others a name of another user to whom user 6 is talking on the voice call.

In another aspect, device 4 may run an application such as Google Voice that allows server 8 to be made aware of the voice call parameters without device 4 needing to send a separate message 15 with the voice call parameters. In this case, server 8 already has access to the voice call parameters, and may automatically send status update messages 16 and command 17 as needed when a call begins or ends.

Figure 1B:
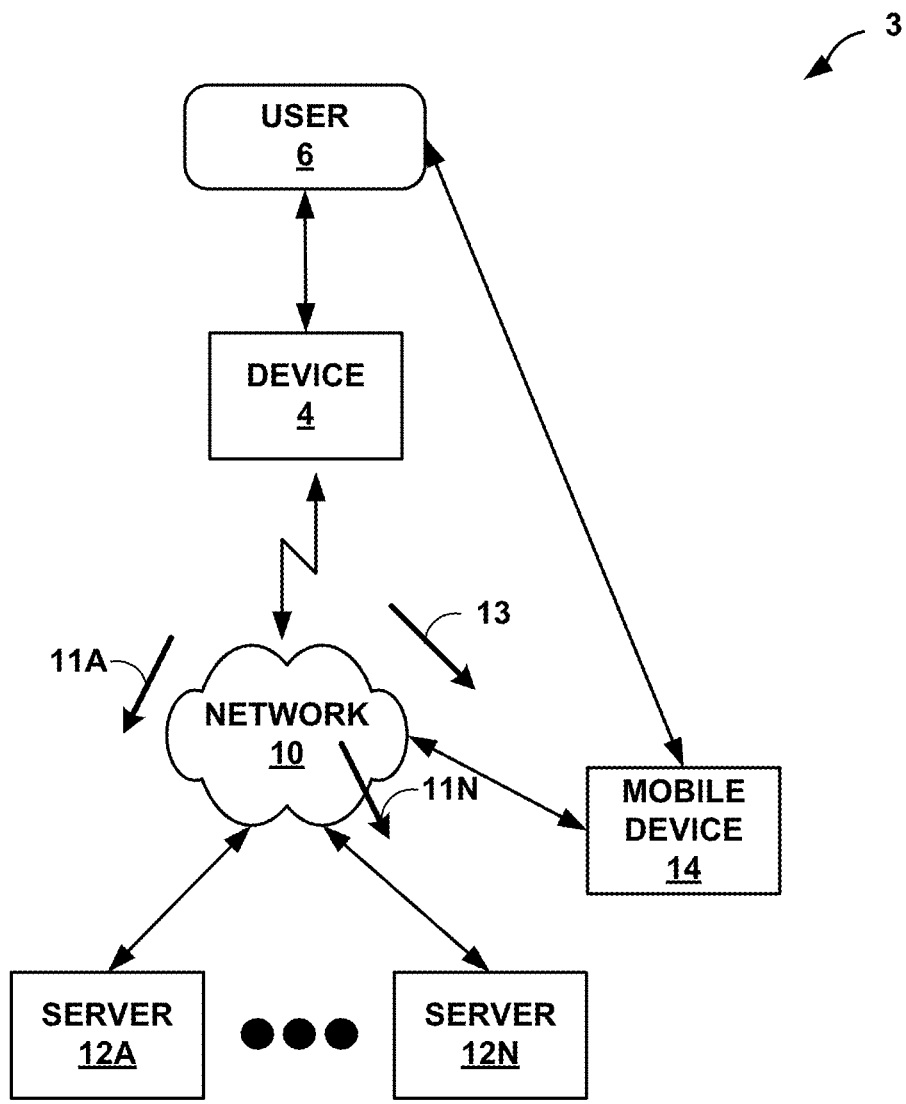

FIG. 1B is a block diagram illustrating another example networked computing environment 3, in accordance with another aspect of the present disclosure. As shown in FIG. 1B, computing system 3 includes device 4 used by user 6, network 10, and one or more servers 12A-12N ("servers 12") and mobile device 14.

User 6 may use device 4 to receive or initiate a voice call. For example, user 6 may use device 4, e.g., a mobile phone, to make a voice call. In one example, when device 4 begins the call, if user 6 has enabled device 4 to share call status with other services, device 4 automatically sends messages 11A-11N ("messages 11") to servers 12, without requiring an intermediate server to distribute the messages to the servers. In one aspect, messages 11 may include voice call parameters similar to those described above with respect to FIG. 1A, and servers 12 may have the ability to receive the voice call parameters and determine a user status based on the voice call parameters. For example, servers 12 may have APIs installed to allow them to interpret the received voice call parameters, and to modify a free/busy status associated with an account of user 6 based on the voice call parameters. The user's account may be stored on a database associated with one of servers 12. The account includes a user profile for the user and identifies one or more contacts of the user. Servers 12 may be each associated with a different online application service.

In another aspect, device 4 may be configured with APIs to automatically provide servers 12 with messages 11 in required format for updating the free/busy status associated with an account of user 6 based on the user's engagement in a phone call using device 4.

In one aspect, upon engaging in a voice call, device 4 sends a message 13 to control mobile device 14 to cause mobile device 14 to block incoming calls from ringing on mobile device 14 and instead to send the calls directly to voice mail. Device 4 may send another message 13 upon ending the voice call to unblock incoming calls from mobile device 14.

Figure 2:
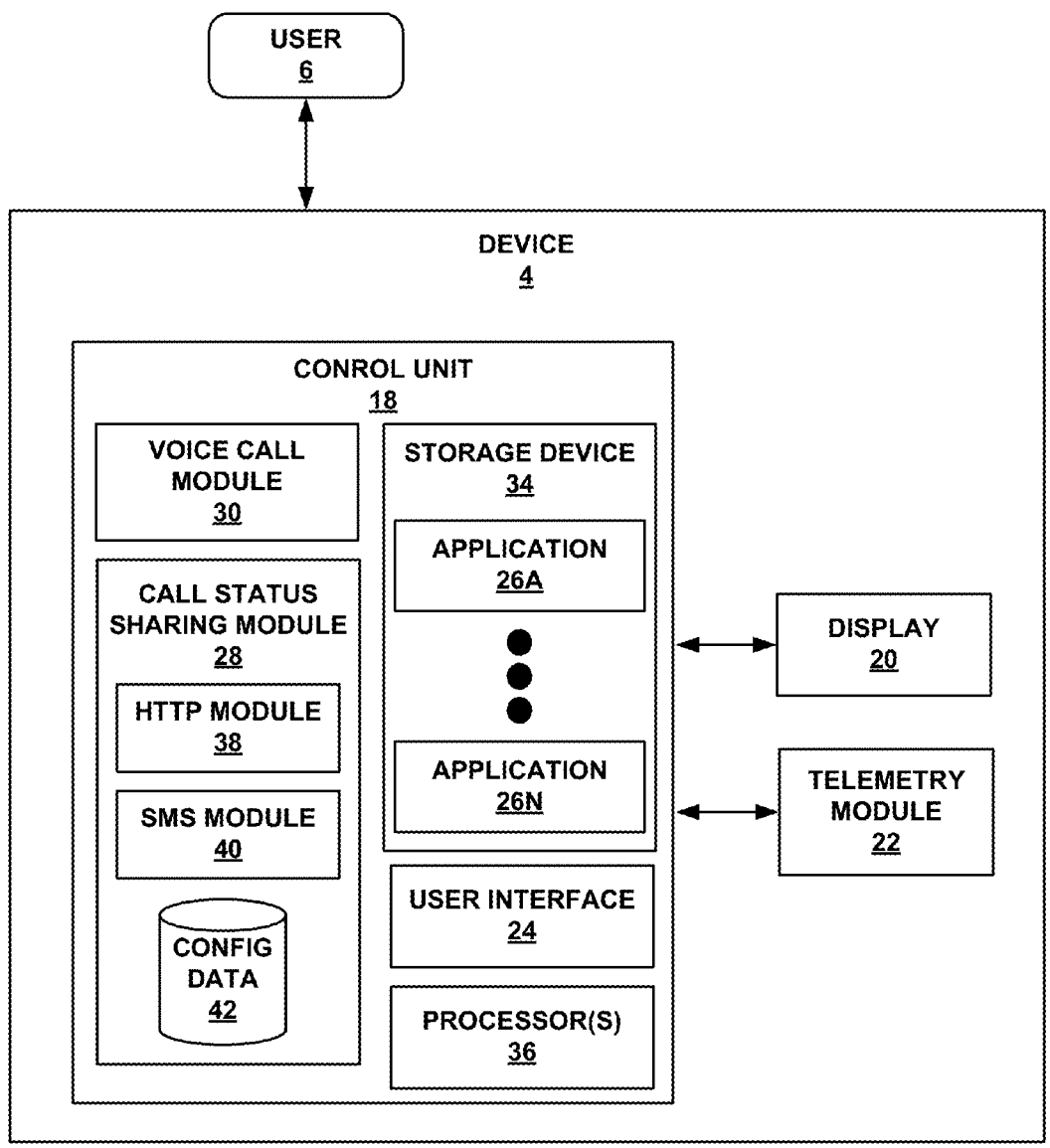
FIG. 2 is a block diagram illustration an example client device, in accordance with one aspect of this disclosure.

FIG. 2 is a block diagram illustration an example device 4 in further detail, in accordance with one aspect of the present disclosure. Device 4 of FIG. 2 may correspond to device 4 of FIGS. 1A and/or 1B. FIG. 2 illustrates only one particular example of device 4, and many other example embodiments of device 4 may be used in other instances.

As illustrated in FIG. 2, control unit 18 includes call status propagation module 28, voice call module 30, storage device 34, and processors 36. Voice call module 30 initiates and receives voice phone calls from and to device 4. Call status sharing module 28 manages sharing of voice call parameters, status updates, and other call status sharing functions, as described in further detail below. Control unit 18 stores instructions for applications 26A-26N ("applications 26") that may be executed by one or more processors 36 within storage device 34. For purposes of illustration only in the following description, applications that may be executed by one or more processors 36 are described below as being executed by one processor 36. Applications 26 may be downloaded by user 6 via network 10 (e.g., from one or more of servers 12) or may be preprogrammed within device 4. Applications 26 may be executed by processor 36 in response to user 6 interacting with device 4 to execute applications 26. Applications 26 may also be executed by processor 36 when user 6 turns on device 4.

Storage device 34 may also include instructions that cause processor 36 to perform various functions ascribed to processor 36 in this disclosure. Storage device 34 may comprise a computer-readable, machine-readable, or processor-readable storage medium that comprises instructions that cause one or more processors, e.g., processor 36, to perform various functions. Storage device 34 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. In some embodiments, storage device 34 may comprise one or more of a non-transitory/tangible storage media, where the data stored in such media may or may not change (e.g., ROM, RAM).

User 6 may interact with user interface 24 and/or display 20 to execute one or more of applications 26 stored on storage device 34. User interface 24 may include a keyboard, touchscreen, mouse, trackpad, touchpad, or other user interface. Display 20 and user interface 24 may be combined, such as a touchscreen that executes a graphical, or soft, keyboard application that provides a keyboard displayed to the user on the touchscreen. Some applications 36 may be executed automatically by device 4 such as when device 4 is turned on or booted up. In response, processor 36 executes the one or more applications selected by user 6, or executes the one or more applications executed by device 4. Processor 36 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to processor 36, in this disclosure, may be embodied as software, firmware, hardware or any combination thereof.

Processor 36 may execute one or more of applications 26 either alone or simultaneously. Examples of applications 26 include web browsers, e-mail, online social networking applications, programs to retrieve stock quotes, programs to search for restaurants, programs that retrieve current and future weather information, games, a program to search the Internet, a program that provides news, a program that provides maps, a program that plays music, a program that records audio, a program that provides driving directions, and other programs executed by processor 36. Applications 26 may be executed based on a request from user 6, and may be terminated based on a request from user 6. Some applications 26 may be running continuously in the background. Some applications 26 may be executed automatically by device 4 such as at power up and may be terminated automatically by device 4 such as at power down.

Device 4 includes voice call module 30 that allows device 4 to initiate or receive voice calls. In one aspect, upon voice call module 30 initiating or receiving a voice call, call status propagation module 28 automatically transmits voice call parameters associated with the voice call to a server, such as server 8 of FIG. 1A or servers 12 of FIG. 1B. For example, the voice call parameters may include one or more of a telephone number associated with the device that initiated the telephone call, a telephone number associated with a device to which the telephone call was directed, and a timestamp indicating at least one of a start time and an end time of the call, an authentication token that identifies the user, and an indicator of whether the call is beginning or ending. As one example, call status propagation module 28 includes an HTTP module 38 that automatically sends one or more HTTP messages that include the voice call parameters. As another example, call status propagation module 28 includes an SMS module 40 that automatically sends one or more SMS messages that include the voice call parameters. Other message types may be used for sending the voice call parameters in other examples.

In the example in which device 4 sends messages directly to servers 12 for updating status, call status sharing module 28 may determine a user status based on voice call parameters obtained from voice call module 30. Call status sharing module 28 may, in some aspects, provide the user status to one or more of applications 26. For example, applications 26 may include applications for Facebook, Twitter, or Google Chat. The applications 26 may format a communication to be sent to one of servers 12 according to the requirements of the respective application 26. The application 26 may provide the communication having the user status to telemetry module 22 for transmission to the server 12.

As one example, storage device 34 may store application instructions associated with a Google Voice application, e.g., application 26A. User 6 may interact with user interface 24 and/or display 20 to execute the Google Voice application. Processor 36 then executes the Google Voice application and causes display 20 to display the application to user 6. User 6 may then interact with user interface 24 and/or display 20 to initiate or receive a voice call. In one example, the Google Voice application utilizes data stored on one or more of servers 12 of FIG. 1. In this example, telemetry module 22 transmits a request for the data to one or more of servers 12, via network 10. Display 20 then presents the received content to user 6.

When user 6 makes a call using the Google Voice application 26A, the Google Voice application 26A causes telemetry module 22 to transmit a request to one or more of servers 12, such as server 12A, to initiate a voice call. By virtue of the request to server 12A, server 12A may already have access to the voice call parameters needed to determine a status update for user 6 without device 4 having to send an additional message to server 12A. Server 12A may then send additional status update messages to other interested servers 12 to update the user's status with other services according to user configuration settings.

In one aspect, user 6 interacts with user interface 24 to configure settings of device 4 for sharing voice call parameters with other devices and/or services. The settings for device 4 relating to voice call status may be stored in configuration data 42 ("config data") of call status propagation module 28. In other examples, device 4 may present other messages or settings options to the user, such as by allowing the user to select from or add additional online services to which user 6 would like device 4 to provide details of the user's calls.

Figure 3:
FIG. 3 is a diagram illustrating an arrangement of components of an example device having a user interface that allows a user of the device to configure settings of the device in accordance with one aspect of this disclosure.

FIG. 3 is a diagram illustrating an arrangement of components of an example device 44 having a user interface 46 that allows a user of device 44 to configure settings of device 44 in accordance with one aspect of this disclosure. In the example of FIG. 3, user interface 46 includes a display that displays a settings screen 47 having a privacy notice 48. Privacy notice 48 notifies the user that device 44 will send details of the user's calls to, for example, Google. The user may select "OK" or may select "Cancel" in response to this notice. In other examples, device 44 may present other messages or settings options to the user, such as by allowing the user to select from or input additional online services to which to provide details of the user's calls.

Figure 4:
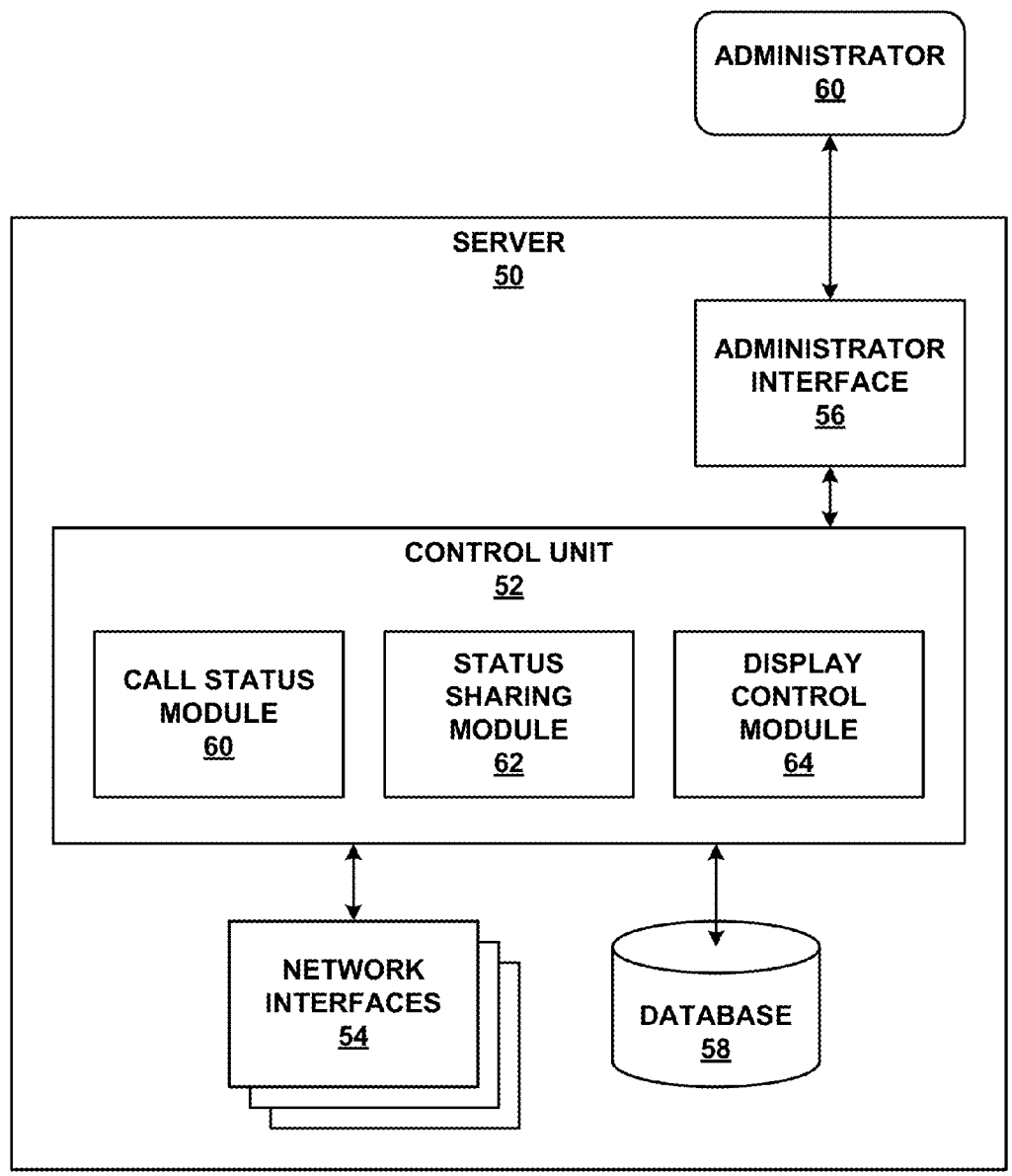
FIG. 4 is a block diagram illustrating an arrangement of components of an example server, in accordance with one aspect of the present disclosure.

FIG. 4 is a block diagram illustrating an arrangement of components of an example server 50, in accordance with one aspect of the present disclosure. Server 50 may correspond to server 8 of FIG. 1A or any of servers 12 of FIGS. 1A-1B. FIG. 4 illustrates only one particular example of server 50, and many other example embodiments of server 50 may be used in other instances.

In the example of FIG. 4, server 50 includes control unit 52, network interfaces 54, administrator interface 56, and database 58. Control unit 52 includes call status module 60, status sharing module 62, and display control module 64, in the example of FIG. 4. Administrator interface 56 allows an administrator 60 to configure server 50.

Control unit 52 may include any combination of hardware, software, and or firmware for performing the functions attributed to control unit 52. For example, control unit 52 may include a computer-readable storage medium encoded with instructions for call status module 60, status sharing module 62, and display control module 64, as well as a processor that executes the instructions. In another example, control unit 52 may include one or more microprocessors, digital signal processors (DSPs), application specific integrated circuits (ASICs), field programmable gate arrays (FPGAs), or any other equivalent integrated or discrete logic circuitry, as well as any combinations of such components. Similarly, any or all of call status module 60, status sharing module 62, and display control module 64 may be functionally integrated.

Network interfaces 54 receive and output data over a network, such as the Internet. In one example, one of network interfaces 54 may correspond to an interface for receiving data from device 4 or servers 12. In one example, one of network interfaces 54 may correspond to an interface for receiving data from telemetry module 22 of device 4. In any case, input interfaces of network interfaces 54 receive data including voice call parameters. Output interfaces of network interfaces 54 may, in various examples, include one or more interfaces for outputting data to device 4 or servers 12. In some examples, input and output network interfaces 54 may be functionally integrated, while in other examples, input and output interfaces may be separate interfaces of network interfaces 54. For example, network interfaces 54 may include one or more network interface cards (NICs) configured to communicate over, for example, Ethernet, transmission control protocol (TCP), Internet protocol (IP), asynchronous transfer mode (ATM), or other network communication protocols. In some examples, server 50 may include a plurality of either or both input and output interfaces.

Call status module 60 executing on control unit 52 may receive voice call parameters that describe at least one characteristic of a voice call in which a user of a device (e.g., device 4) is participating. In some aspects, call status module 60 receives the voice call parameters by a message 15 from device 4, received at server 50 via one of network interfaces 54. In other aspects, call status module 60 receives the voice call parameters by a message 11 from device 4, as described with respect to FIG. 1B. In other aspects, call status module 60 receives the voice call parameters from a Google Voice application (not shown) running on server 50, without requiring a separate message from device 4. In further aspects, call status module 60 may receive a user status message from an intermediate server.

Responsive to receiving the voice call parameters, call status module 60 may determine a status of the user based on the received voice call parameters, and may provide the determined user status to status sharing module 62. For example, call status sharing module 60 may maintain a history of voice call parameters received for the user, e.g., in database 58, and may determine the user status based on an analysis of the history of voice call parameters. When analysis of the history of voice call parameters indicates that the user has started a new call, call status module 60 may determine that the user has a "busy" status. When analysis of the history of voice call parameters indicates that the user has concluded an existing call, call status module 60 may determine that the user has a "free" status. Status sharing module 62 may output status update messages 16 to other servers 12 that indicate the user's status. Status sharing module 60 may determine servers 12 to which to output the status update messages based on user-specific configuration data stored in database 58.

Call status module 60 may additionally or alternatively cause incoming calls to be blocked to another mobile device, such as mobile device 14 of FIG. 1A, based on the received voice call parameters. For example, mobile device 14 may belong to the same user as device 4. In this example aspect, server 50 may also determine a status of the user based on the received voice call parameters and modify a user profile in the account for the user to reflect the status of the user. Call status module 60 may identify the mobile device 14 as also being associated with the user, and may block incoming voice calls to mobile device 14 responsive to receiving the voice call parameters, when the voice call parameters indicate the user is participating in the voice call using the first voice. For example, instead of the incoming calls ringing on mobile device 14, the incoming calls may be sent directly to a voice message service associated with mobile device 14 without immediately notifying the user of the incoming voice calls to mobile device 14. Server 50 may also receive second voice call parameters that describe at least one characteristic of the voice call, and, responsive to receiving the second voice call parameters, may allow incoming voice calls to mobile device 14 when the second voice call parameters indicate the user is no longer participating in the voice call using device 4.

In some embodiments, server 50 may be a server associated with an online application service, such as Google or Facebook. In that case, server 50 may receive voice call parameters from a device 4 and may similarly determine the user's status, or may receive a status update message that indicates the user's status. Display control module 64 may modify a user's profile in an account stored in database 58 associated with the online application service to reflect the status of the user. The user's profile may be displayed by a second, different device, such as a personal computer or other device. The user's profile is presented by the online server to individuals other than the user, e.g., to the user's contacts identified in the user profile. The contacts of the user may be added to the account by the user. For example, the user's updated profile may be viewed by the user's friends, family members, business associates, and/or acquaintances, with whom the user is connected via the online service. In one aspect, display control module modifies the user profile to reflect the status of the user, and sends the modified user profile from the server 50 to at least one device associated with at least one of the contacts of the user, such that the modified user profile is displayable by the device associated with the contact(s).

Figure 5:
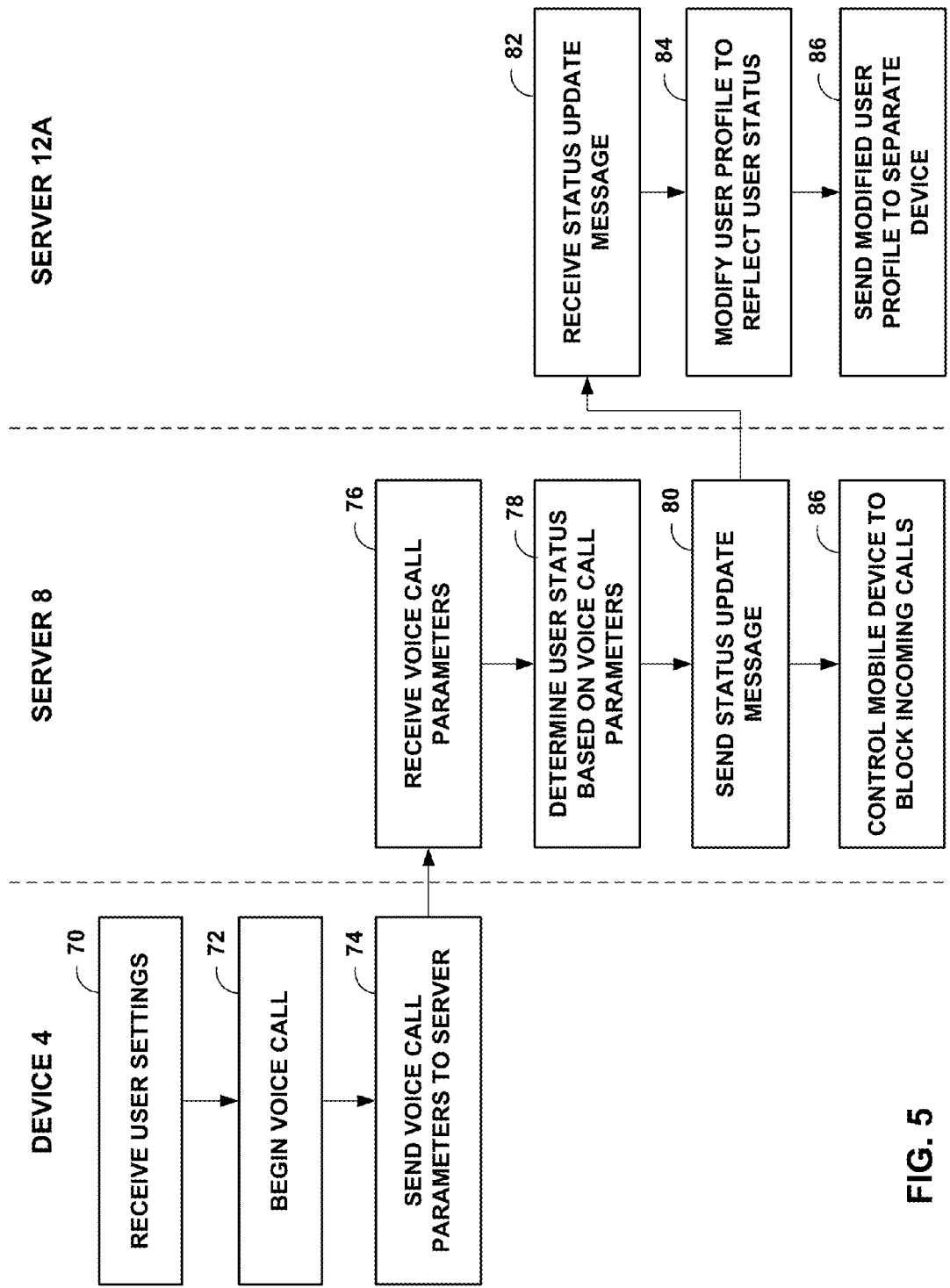
FIG. 5 is a flow diagram illustrating example operation of devices in sharing call information in accordance with aspects of this disclosure.

FIG. 5 is a flow diagram illustrating example operation of devices in sharing call information in accordance with aspects of this disclosure. FIG. 5 will be described for purposes of illustration with respect to the example networked computing environment of FIG. 1A. Device 4 receives user input via user interface 24 authorizing device 4 to send voice call parameters to server 8. Device 4 may also receive user configuration settings indicating which online applications may receive voice call parameters or user status information (70). Additionally or alternatively, device 4 may receive user input indicating other mobile devices to which to block incoming phone calls while the user is engaged in a call on device 4. For example, the user may input a phone number of mobile device 14 belonging to the user. Device 4 may save these settings and authorization information to configuration data 42, or may send certain information up to server 8 to be saved in database 58 of server 8.

Device 4 begins a voice call using voice call module 30 (72). For example, voice call module 30 may receive an incoming voice call from another device, or may initiate an outgoing voice call to another device. Upon beginning the voice call, call status sharing module 28 may obtain voice call parameters from voice call module 30 and device 4 automatically sends voice call parameters associated with the voice call to server 8 (74). The voice call parameters describe at least one characteristic of the voice call in which the client device is engaged. For example, the voice call parameters may include one or more of a telephone number associated with a device that initiated the telephone call, a telephone number associated with a device to which the telephone was directed, a timestamp indicating a start time of the call, and an authentication token that allows the server to recognize the user associated with the device. Device 4 may, for example, send the voice call parameters as an HTTP message using HTTP module 38 or as an SMS message using SMS module 40. Device 4 sends the voice call parameters as a background task without any action by the user after starting the call.

Server 8 receives the voice call parameters from device 4 via one of interfaces 54 (76). Call status module 60 of server 8 determines a status of the user based on the received voice call parameters (78), and may provide the determined user status to status sharing module 62. Status sharing module 62 may output status update messages 16 to other servers 12 that indicate the user's status (80). Status sharing module 60 may determine servers 12 to which to output the status update messages based on user-specific configuration data stored in database 58. Server 12A receive a status update message 16 from server 8 (82), and may modify a user profile associated with the user to reflect the status update (84). The user profile may be stored by server 12A in database 58 of server 12A. For example, when the user is engaged in a voice call, server 12A may modify the stored user profile to indicate that the user is engaged in a voice call, and may also indicate one or more other users engaged in the voice call, and duration of the call in progress. Server 12A may, in turn, send the stored user profile to another device other than the user's device 4, e.g., when a device requests the user profile to display to an individual other than the user. In this manner, device 4, server 8, and server 12A cooperate to automatically provide a user status update while the user is engaged in a voice call without requiring the user to separately update his or her status.

Server 8 may additionally or alternatively cause incoming calls to be blocked to another mobile device, such as mobile device 14 of FIG. 1A, based on the received voice call parameters (86). For example, mobile device 14 may belong to the same user as device 4. Instead of the incoming calls ringing on mobile device 14, the incoming calls may be sent directly to voicemail. This allows the user to avoid being interrupted by other incoming calls while the user is engaged in a call on device 4. Server 8 may determine which other mobile devices to block calls on based on user-specific settings saved in database 58.

Figure 6:
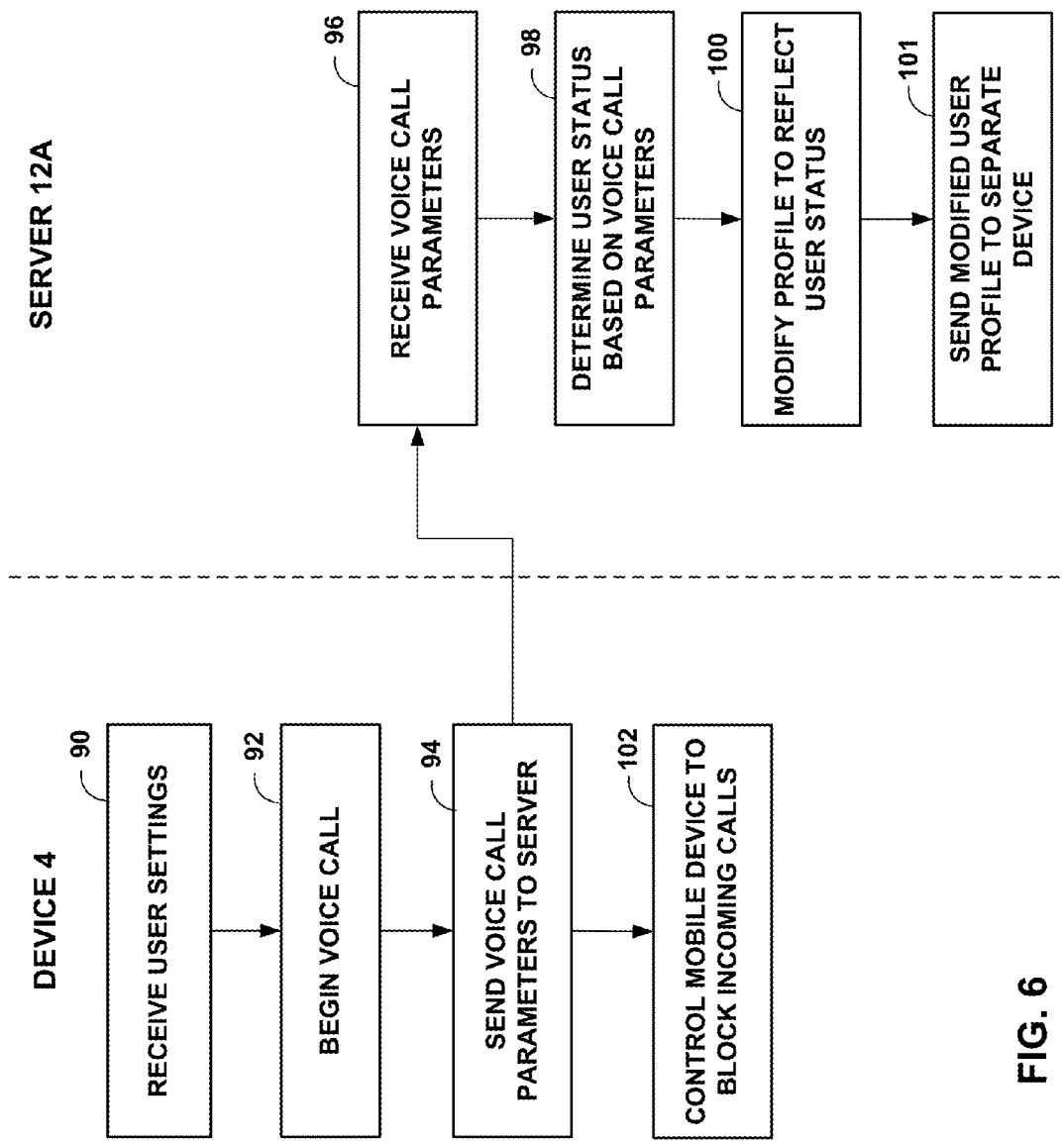
FIG. 6 is a flow diagram illustrating another example operation of devices in sharing call information in accordance with aspects of this disclosure.

FIG. 6 is a flow diagram illustrating another example operation of devices in sharing call information in accordance with aspects of this disclosure. FIG. 6 will be described for purposes of illustration with respect to the example networked computing environment of FIG. 1B, and with respect to features of FIGS. 2 and 4. In a similar manner as described above with respect to FIG. 5, device 4 receives user input via user interface 24 authorizing device 4 to send voice call parameters to server 8. Device 4 may also receive user configuration settings indicating which online applications may receive voice call parameters or user status information (90). Additionally or alternatively, device 4 may receive user input indicating other mobile devices to which to block incoming phone calls while the user is engaged in a call on device 4. For example, the user may input a phone number of mobile device 14 belonging to the user. Device 4 may save these settings and authorization information to configuration data 42.

Device 4 begins a voice call using voice call module 30 (92). For example, voice call module 30 may receive an incoming voice call from another device, or may initiate an outgoing voice call to another device. Upon beginning the voice call, call status sharing module 28 may obtain voice call parameters from voice call module 30 and device 4 automatically sends voice call parameters associated with the voice call to server 8 (94). Device 4 sends the voice call parameters as a background task without any action by the user after starting the call. Server 12A receives the voice call parameters from device 4 via one of interfaces 54 (96). Call status module 60 of server 12A determines a status of the user based on the received voice call parameters (98), and display control module 64 modifies a user profile associated with the user to reflect the status update (100). For example, the user profile may be stored by server 12A in database 58 of server 12A. Alternatively, device 4 may determine the user status based on the voice call parameters and may send a user status update to server 12A. Server 12A may send the stored user profile from server 12A to another device other than device 4, and the other device may display the user profile to an individual other than the user 6 of device 4. For example, a friend or family member of user 6 may view on the their own computer a modified user profile of user 6 that indicates that user 6 is engaged in a voice call.

Device 4 may also cause incoming calls to be blocked to another mobile device, such as mobile device 14 of FIG. 1A, based on the received voice call parameters (102), either by directly communicating with mobile device 14, or via an intermediate server device.

EXAMPLES

Figure 7:
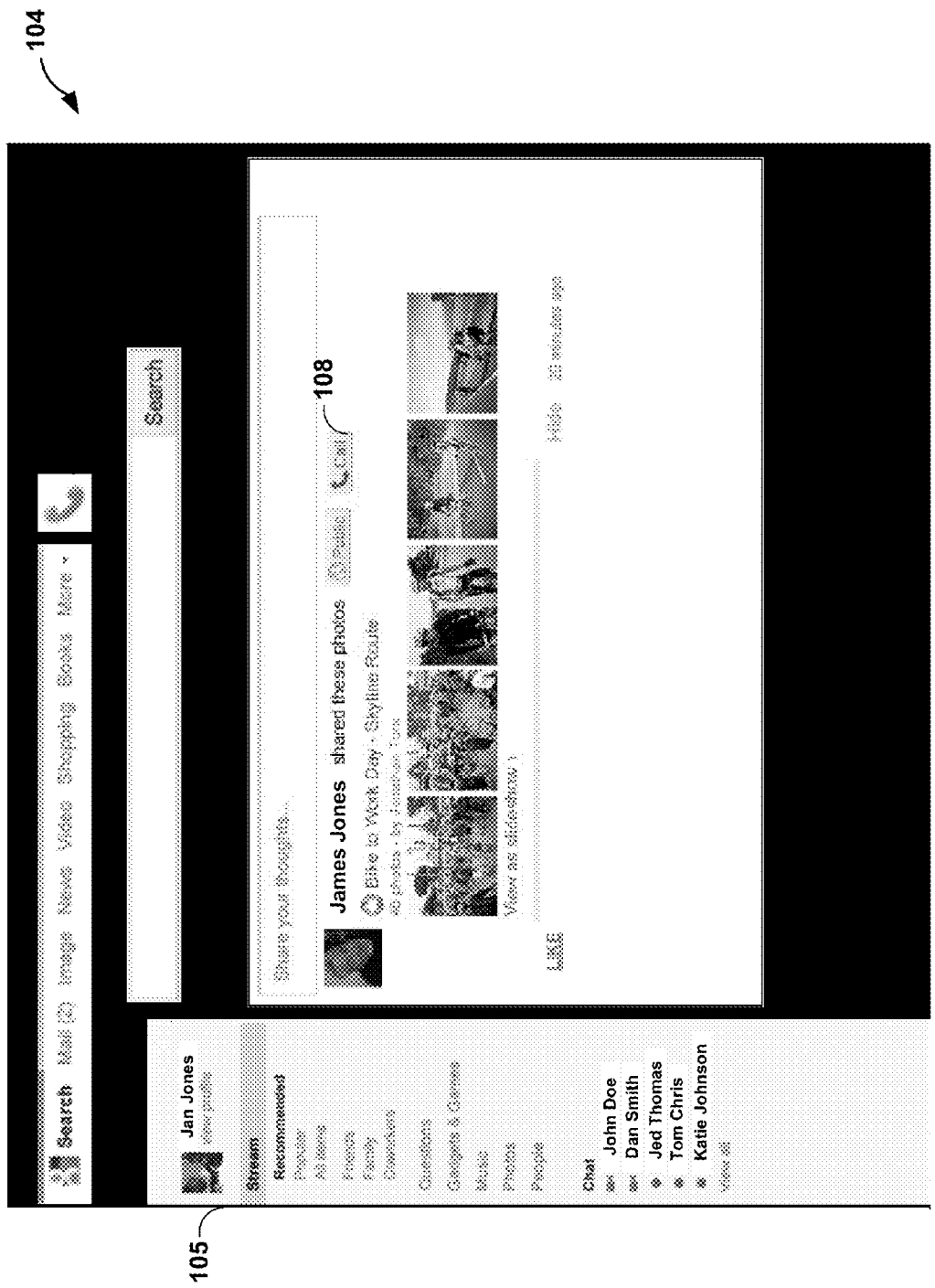
FIG. 7 is a screen diagram illustrating an example online application that indicates a user's call status in accordance with one aspect of this disclosure.

FIG. 7 is a screen diagram illustrating an example online application that indicates a user's call status in accordance with one aspect of this disclosure. FIG. 7 shows a display 104 that a user 105 might see when logged in to the online application. The display shows some information associated with the logged-in user 105, and shows some information associated with other users with whom the user 105 is connected. As shown in FIG. 7, display 104 includes a call button 106 that user 105 might use to initiate a voice call from her computer. When the call button 106 includes a telephone icon as shown, this may indicate that user 105 is currently not engaged in a voice call. In addition, display 104 includes a call button 108 next to the profile of a user "James Jones." Call button 108 may be clicked to place a call to that user. When the call button 108 includes a telephone icon as shown, this may indicate that the user James Jones is currently not engaged in a voice call. In this sense, the call button 108 indicates a call status associated with the user profile for James Jones.

Figure 8:
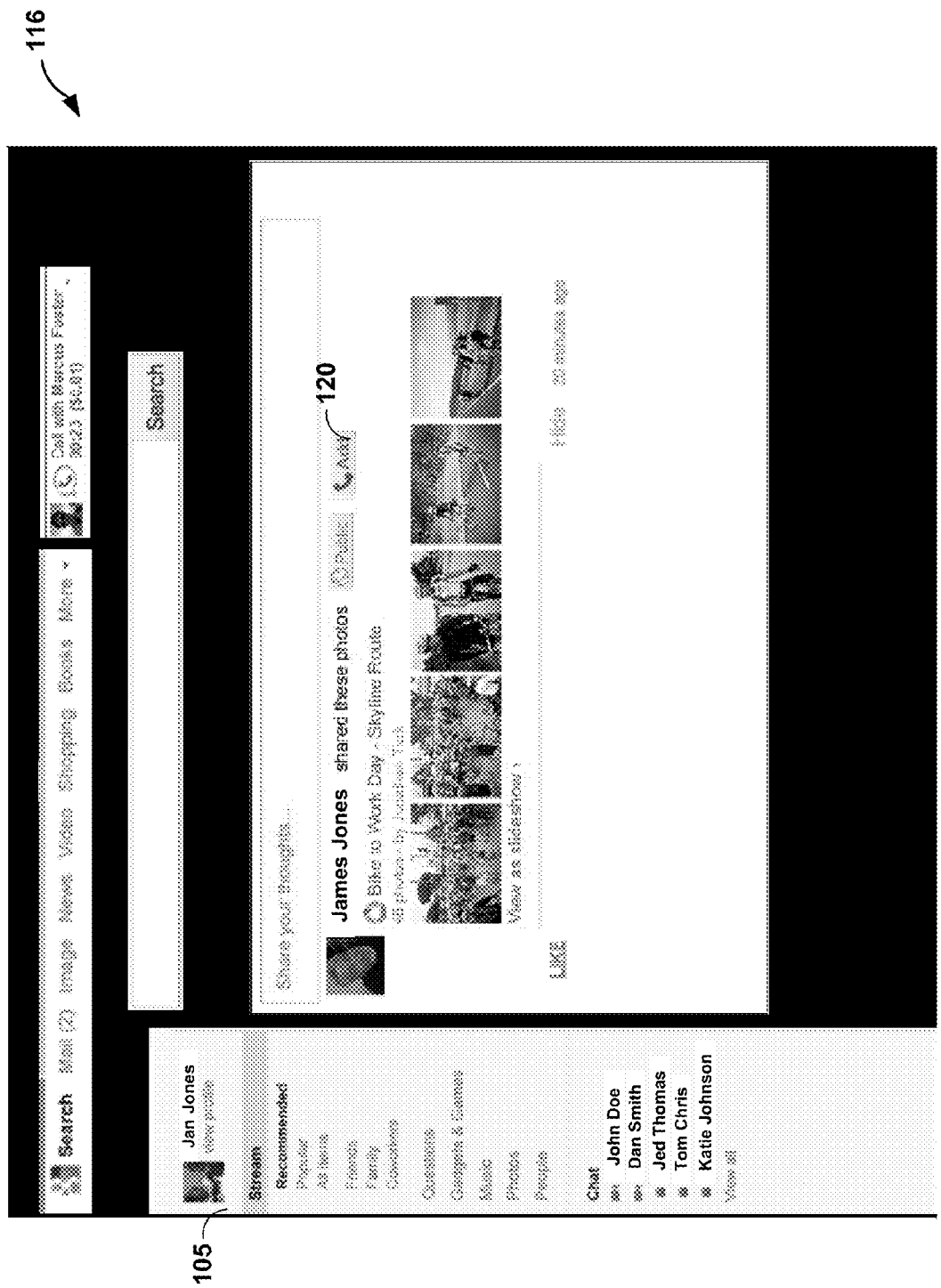
FIG. 8 is a screen diagram illustrating an example online application that indicates a user's call status in accordance with one aspect of this disclosure.

FIG. 8 is a screen diagram illustrating an example online application that indicates a user's call status in accordance with one aspect of this disclosure. FIG. 8 shows an updated display 116 that the user 105 might see some time after the display of FIG. 7, after the user is engaged in a voice call. For example, the user 105 might be making the voice call from a mobile device, such as a mobile phone, or might be making the voice call from a computer using an application such as Google Voice. In accordance with the techniques described herein, the online application that presents the display 116 has been made aware of the fact that the user 105 is engaged in a voice call, and has updated the profile of user 105 to reflect that the user is engaged in the voice call. In the example of FIG. 8, the profile of user 105 includes a badge 118 that indicates that the user is on a voice call with Marcus Foster, and indicates that the call has a current duration of 23 minutes, at a cost of $6.01. Thus, the user status has been updated to "on a call with Marcus Foster." Further, the online application has updated the display of the profile of James Jones to change call button 106 (FIG. 7) to an add button 120. Clicking add button 120 would allow user 105 to add the user James Jones to the voice call with Marcus Foster.

Figure 9:
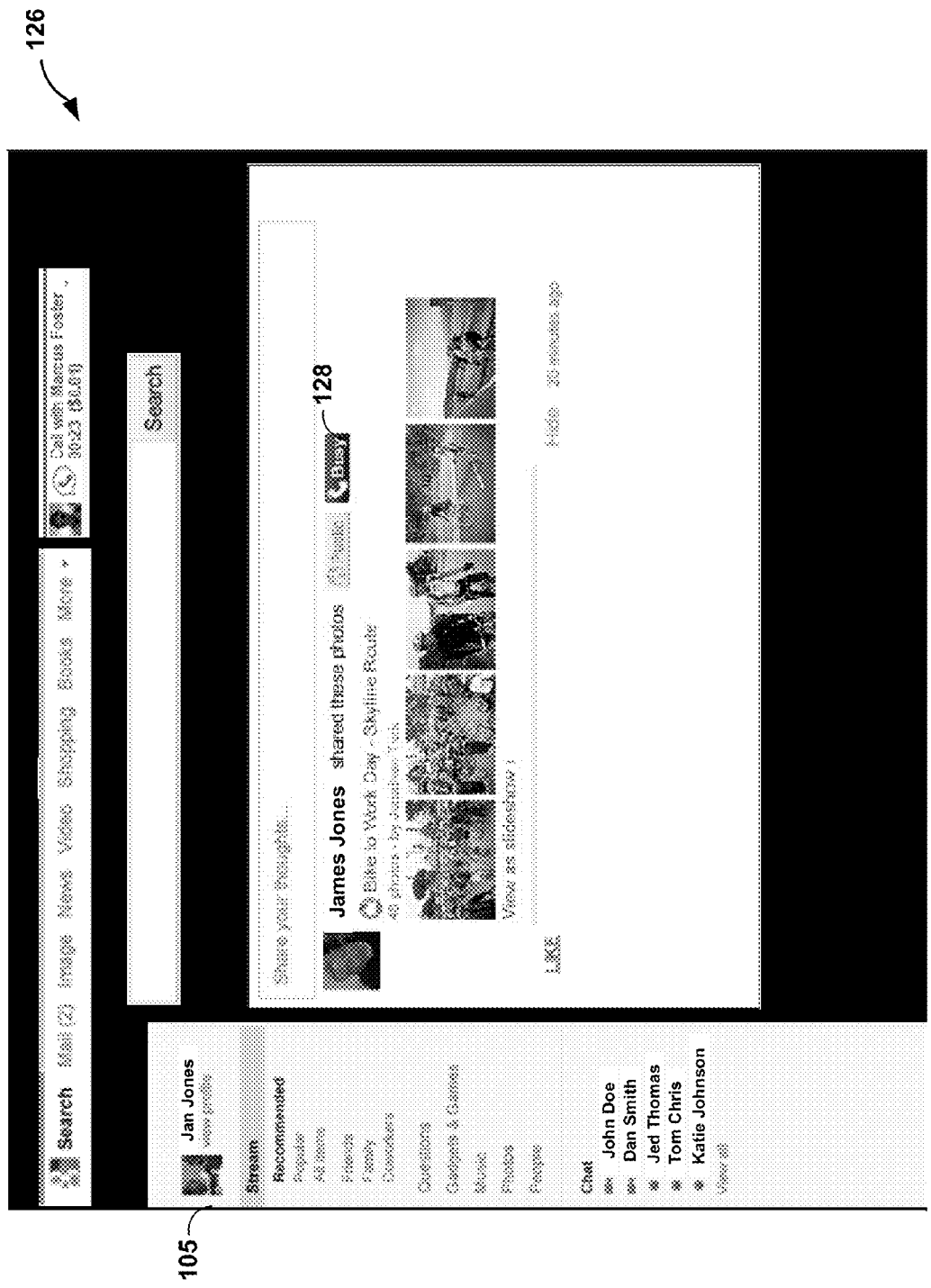
FIG. 9 is a screen diagram illustrating an example online application that indicates a user's call status in accordance with one aspect of this disclosure.

FIG. 9 is a screen diagram illustrating an example online application that indicates a user's call status in accordance with one aspect of this disclosure. FIG. 9 shows an updated display 126 that might be presented to user 105. In the example of FIG. 9, the user James Jones is now engaged in a voice call, and his profile display includes a busy button 128, rather than a call button 106 or an add button 120. In accordance with the techniques described herein, James Jones has engaged in voice call using a device, and the device may have automatically communicated voice call parameters that allow the online application to update his user profile to indicate that his user status is "busy" for the duration of his voice call. In this sense, the busy button 128 indicates a modified call status of "busy" associated with the user profile for James Jones.

Figure 10:
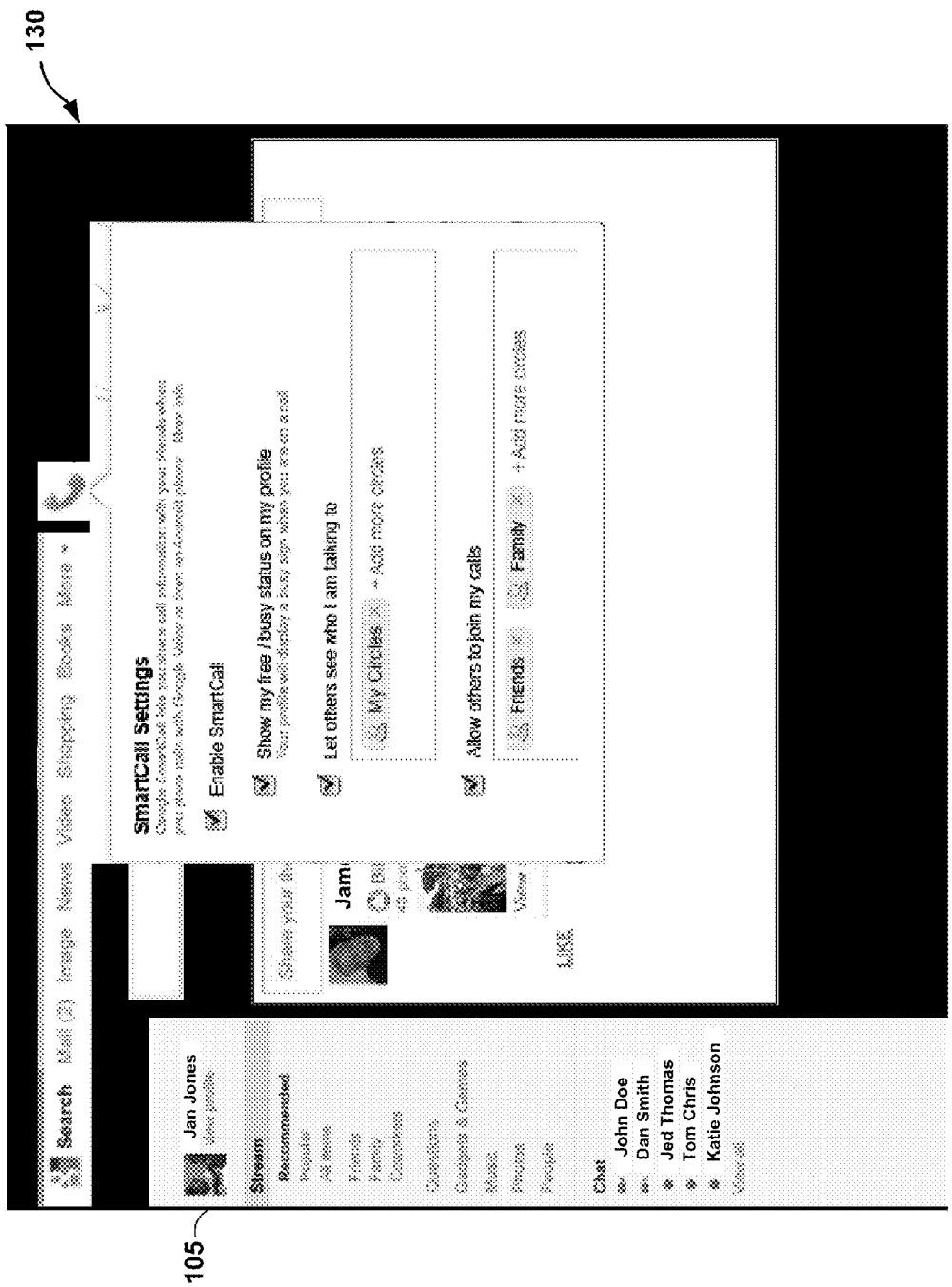
FIG. 10 is a screen diagram illustrating example application settings that may be presented to a user in accordance with one aspect of this disclosure.

FIG. 10 is a screen diagram illustrating example application settings that may be presented to a user in accordance with one aspect of this disclosure. FIG. 10 shows a display 130 that user 105 may see when user 105 wishes to update her configuration settings. User 105 is presented with a "Smart-Call Settings" box 132. For example, user 105 may access SmartCalls Settings box 132 by right-clicking on call button 106. SmartCalls Settings box 132 may be used to enable the user to share information with her friends when placing certain voice calls. SmartCalls Settings box 132 allows the user to decide whether to show a busy sign on her profile when she is on a call, whether to let others see who she is talking to, and whether to allow others to join her calls. The user can select which subsets of her connections can have certain access features.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

Various embodiments of this disclosure have been described. These and other embodiments are within the scope of the following claims.

The invention claimed is:
1. A method comprising:
receiving, by a client device, user input authorizing the client device to send voice call parameters to a server device, wherein the client device is physically separate from the server device;
displaying, by a user interface of the client device, settings options for selecting one or more online services to which the client device will provide details of calls made using the client device; and
responsive to determining that the client device is engaged in a voice call and has received the user input, sending, by the client device, a message to the server device indicating a voice call parameter associated with the voice call, wherein the voice call parameter describes at least one characteristic of the voice call in which the client device is engaged.

2. The method of claim 1, further comprising:
responsive to determining that the client device is engaged in the voice call and has received the user input, sending messages to a plurality of server devices indicating the voice call parameter, wherein each of the server devices is associated with an online application service.

3. The method of claim 1, wherein the message comprises one of a HyperText Transfer Protocol (HTTP) message and a Short Message Service (SMS) message.

4. The method of claim 1, wherein the voice call parameter includes one or more of a telephone number associated with a device that initiated the voice call, a telephone number associated with a device to which the voice call was directed, a timestamp indicating at least one of a start time and an end time of the voice call, and an authentication token that identifies the user.

5. The method of claim 1, further comprising:
displaying, by a user interface of the client device, a privacy notice indicating that if the privacy notice is accepted then the client device will send details of calls made using the client device to a server device,
wherein receiving the user input comprises receiving user input by the user interface of the client device, wherein the user input indicates acceptance of the privacy notice.

6. The method of claim 1, further comprising displaying, by a user interface of the client device, settings options for inputting one or more online services to which the client device will provide details of calls made using the client device.

7. The method of claim 1, wherein the client device comprises a mobile phone, and wherein the voice call is made using a telephone network.

8. The method of claim 1, further comprising:
responsive to receiving the voice call parameter, blocking incoming voice calls to a second device of the user, wherein the second device is physically separate from the first device and the server device.

9. The method of claim 8, wherein blocking incoming voice calls to the second device comprises blocking the incoming voice calls responsive to determining that the voice call parameter indicates the user is participating in the voice call using the first device.

10. The method of claim 8, wherein blocking incoming voice calls to the second device comprises blocking the incoming voice calls by the server device.

11. A system comprising:
an interface to receive user input authorizing a client device to send a voice call parameter to a server device and display settings options for selecting one or more online services to which the client device will provide details of calls made using the client device, wherein the client device is physically separate from the server device; and
means for sending a message to the server device indicating a voice call parameter associated with the voice call, responsive to determining that the client device is engaged in a voice call and has received the user input, wherein the voice call parameter describes at least one characteristic of the voice call in which the client device is engaged.

12. The system of claim 11, wherein the means for sending comprises a call status sharing module of the client device.

13. A non-transitory computer-readable storage medium comprising instructions that cause one or more processors to:
receive user input authorizing a client device to send voice call parameters to a server device, wherein the client device is physically separate from the server device;
display, at a user interface, settings options for selecting one or more online services to which the client device will provide details of calls made using the client device; and
responsive to determining that the client device is engaged in a voice call and has received the user input, send a message to the server device indicating a voice call parameter associated with the voice call, wherein the voice call parameter describes at least one characteristic of the voice call in which the client device is engaged.

* * * * *